United States Patent Office 2,702,477
Patented Feb. 22, 1955

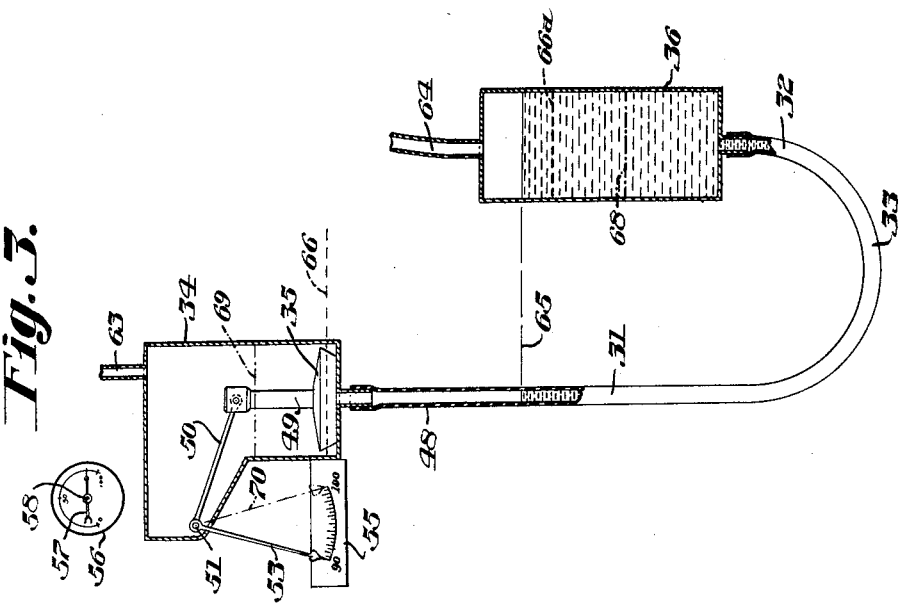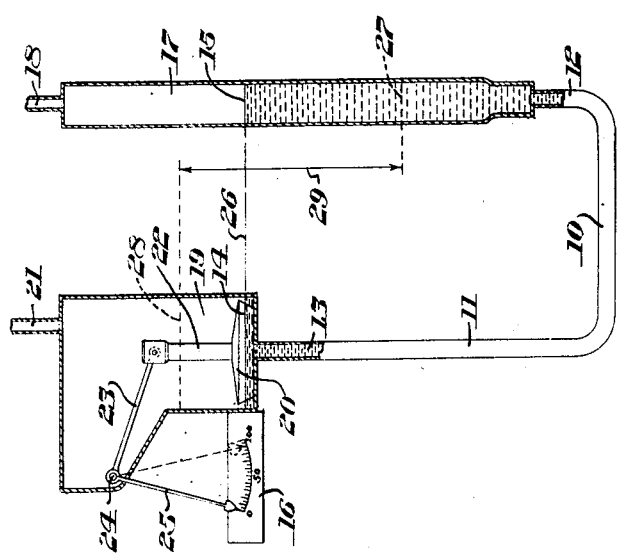

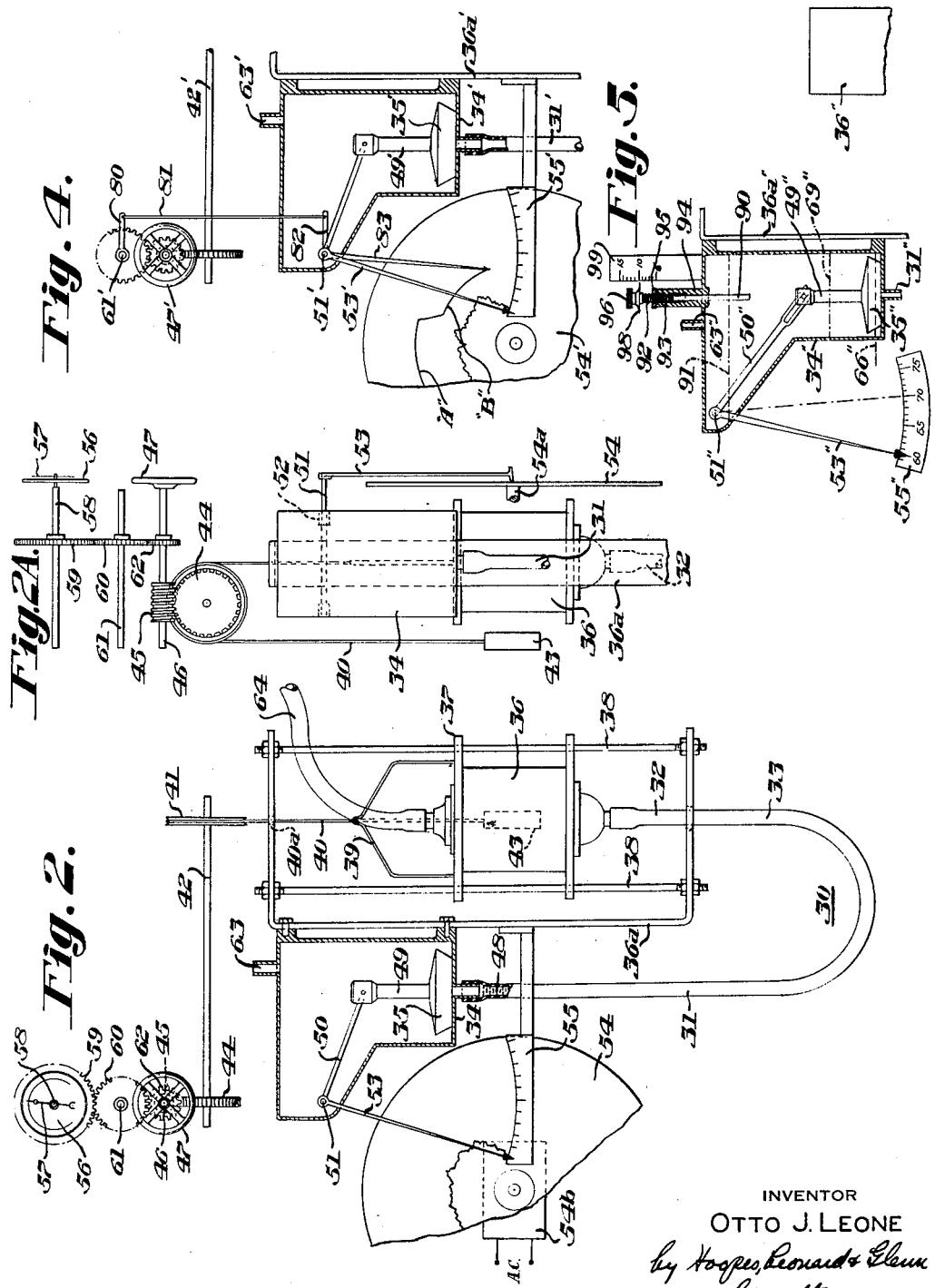

2,702,477

SUPPRESSED RANGE DEFLECTION-TYPE MANOMETRIC SYSTEM

Otto J. Leone, West Newton, Pa.

Application April 6, 1950, Serial No. 154,315

4 Claims. (Cl. 73—403)

This invention relates to a deflection-type manometric system of the U-tube class having a liquid reservoir which is relatively movable to enable a selected portion of a pressure range to be suppressed. Further, it relates to such a system in which the unsuppressed portion of a pressure range can be shifted. Still further, the actuation of this system in that unsuppressed portion may be magnified to provide vernier indication, recording or control.

Manometers of the U-tube class are broadly old and measure differential pressures across the legs or sides of the manometer involved. Such differential pressures are shown by the difference in the height of the respective surfaces of the manometer liquid in the legs generally irrespective of the area or inclination, if any, of either side. It is also common to provide such manometers with a liquid reservoir in one or both legs and to have a movable member therein such as a float in pivotal relation to the structure to actuate an indicator pointer, a recording chart pen, a controller device, or any combination thereof.

The differential pressure measured across the legs or sides of any manometer of the U-tube class may be a so-called "differential pressure" as in the case of the difference between the pressures respectively existing at spaced taps in a continuous flowing stream of fluid, for example, having an orifice between the taps. Such taps may be connected in a conventional manner by ducts to the respective legs of the manometer structure and are usually respectively designated as a low-pressure tap and as a high-pressure tap. Or, one leg of a manometer may be opened to atmospheric pressure and the other leg tapped into a source of fluid pressure so that the "differential pressure" recorded by the manometer becomes what is called a "static pressure" on a "gage" basis. In other cases, the low-pressure leg instead of being opened to atmosphere may be connected to a reference vacuum and pressure readings taken on an "absolute" basis.

In the measurement of such pressure differentials, it frequently happens that the operating pressure range of the process or apparatus, as to which pressure measurements are to be made, is of particular interest only as respects a selected portion of that pressure range. Hence, a conventional unsuppressed measuring apparatus may be used which is sensitive to the exertion of pressures only within that portion of the pressure range which is of interest. Such a solution is too limited for many purposes. On the other hand, a form of actual suppression of a portion of a pressure range of lesser interest has been available in certain measurement instruments. These instruments are acted upon by pressures within and without the selection portion of the pressure range but are usually constructed to begin their indication on a calibrated scale as the pressure impressed upon the instrument approaches or enters the selected portion of the entire range. This occurs in certain types of Bourdon gages, piston gages, and spring-loaded diaphragm gages. However, the amount of such suppression is usually very limited. Further, the disadvantage of such gages is that they are not primary measuring standards but must be calibrated frequently against a primary standard such as a liquid manometer of the U-tube class. Some limited suppression may also be obtained in certain instruments of a tilting or balance beam type such as the one illustrated in United States Patent No. 2,089,862. Such balanced instruments have relatively limited flexibility and are subject to the need for frequent calibration and the influence of complex moments of force about the pivots which impair their usefulness.

In the manometric system of this invention employing a manometer of the U-tube class, the foregoing problems have been overcome. Thus, the system is itself a primary standard avoiding calibration difficulties. Further, it is sufficiently flexible to enable the operator to suppress extensive portions of the pressure ranges which will be encountered. Moreover, the unsuppressed portion can quickly and accurately be shifted to any other part, whether terminal or intermediate, of a pressure range if the need arises. In addition, the system of this invention provides a direct deflection-type indication, recording or control actuation. Hence, in the system of this invention it is not necessary to return the instrument to any "null" position as illustrated in one case by United States Patent No. 2,380,177.

Further by means of the system of this invention, a magnification of the indicating, recording or control actuation may be obtained in combination with whatever suppression is desired within the design capacity of the instrument assembly used. With such magnification, incremental or decremental pressures of very small order can be accurately determined despite the existence of extensive operating pressure ranges in the process or equipment to which the system is applied. Other objects and advantages will be apparent from the following description and from the drawings, which are diagrammatic only, in which, Figure 1 is a diagrammatic view of a standard manometer of the U-tube class;

Figure 2 is a front view of a manometer structure embodying the system of this invention;

Figure 2A is a side view of the manometer structure shown in Figure 2;

Figure 3 is a diagrammatic view of the structure shown in Figure 2 effecting a suppression of a major portion of the pressure range;

Figure 4 is a diagrammatic view of the system of this invention shown in Figure 2 modified to record the datum pressure at the junction between a suppressed portion of the pressure range and the unsuppressed portion of the pressure range; and Figure 5 is another modification of the system of this invention suitable for use when the unsuppressed portion selected may be intermediate the extremes of the full pressure range.

In a standard unsuppressed manometer as shown in Figure 1, a U-tube 10 has two legs or sides 11 and 12 in direct communication with each other through the bend of a standard U-tube. A predetermined quantity of manometer liquid 13 is in tube 10 and has a surface 14 in leg 11 and a surface 15 in leg 12. This manometer or system liquid may be water where the size of the apparatus is not a restriction or it may be mercury where it is or it may be another suitable but less commonly used liquid. Irrespective of the liquid used, the system can be calibrated in any desired units. For example and by way of illustration only, the scale markings on an indicator scale 16 in Figure 1 are in inches of water as applying to an operation in which the overall operating pressure range is assumed to be in the order of 100 inches of water starting at 0 inches.

A liquid reservoir 17 forms an upper portion of side 12 and is attached to a "high-pressure" tap or passage 18 leading to a fluid higher pressure source. Another liquid reservoir 19 forms an upper portion of leg 11 and comprises a chamber for a float 20. A "low-pressure" tap 21 leads to a fluid lower pressure source so that liquid 13 may be responsive to the difference between the pressures existing in taps 18 and 21.

Float 20 floats on surface 14 and has a stem 22 pivoted to a link 23 connected to a shaft 24 which is provided with relatively frictionless bearings (not shown) and extends through the walls of chamber 19 supporting such bearings. An indicator pointer 25 is also attached to shaft 24 so as to be deflected through an arc covering scale 16 between the markings at the two extremities thereof. In operation, with equal pressures in taps 18 and 21, both surfaces of liquid 13 will have a common level in legs 11 and 12 such as may be indicated by common level line 26 coinciding with the plane of surfaces 14 and 15. At level 26, pointer 25 points to the "0" mark on scale 16. As the pressure in tap 18 increases relatively over the pressure exerted through passage 21 surface 15 will be lowered to an intermediate level 27, shown in dotted lines, and surface 14 correspondingly raised to an intermediate level 28, shown in dotted lines, so that the vertical distance 29 between levels 27 and 28 will represent the relative increase in pressure in tap 18 over the pressure in tap 21 whether or not the pressure in tap 21 or in tap 18 has itself changed. This vertical distance 29 will be the same for the same given pressure differential between taps 18 and 21 irrespective of the relative internal cross sectional areas of the legs 11 and 12 and the respective reservoirs therein. In moving from level 26 to level 28, surface 14 will correspondingly raise float 20 and swing pointer 25 to, for example, the 90 marking on the scale where that is the pressure differential required to produce the surface height difference 29. It will be seen that the standard instrument shown in Figure 1 is not suppressed and that the arcuate movement of pointer 25 for each pressure change of 1 inch of water, for example, is too small to be accurately or satisfactorily read.

In the system of this invention as shown in Figure 2, a manometer 30 is provided having a leg or side 31 and a second leg or side 32. These legs are in direct communication with each other through a flexible tube 33 of any suitable material extending around the bend of the U-tube and upwardly along the respective sides. A liquid reservoir 34 is provided in the upper part of leg 31 and forms a float chamber for a conventional float 35. Chamber 34 is preferably bolted in fixed position to a frame member 36a which is usually attached to or adjacent the equipment having the fluid pressure source or sources to be impressed on manometer 30. A second reservoir 36 forms an upper portion of leg 32 and is connected to tube 33 on that side. Liquid reservoir 36 is movable relative to reservoir 34 and is provided with cross arms 37 drilled for relative slidable guiding engagement on guide rods 38. These guide rods 38 are bolted to and extend between spaced horizontal flanges of member 36a.

A bail 39 is connected to the upper of the cross arms 37 and also to a flexible cable 40. Cable 40 passes through an opening 40a in the upper horizontal flange and is reeved over a sheave 41 fixed on a shaft 42 journaled in brackets (not shown) which are fixed relative to the frame member 36a. In order to prevent any relative slipping between cable 40 and sheave 41, the cable may be tack welded at one point to the sheave so as not to interfere with the predetermined raising or lowering of reservoir 36 by rotation of shaft 42. Or, cable 40 may be constructed in the form of a sprocket chain and sheave 41 in the form of a sprocket wheel. A counterweight 43 is connected to the free end of cable 40 to facilitate the rotation of shaft 42 in adjusting the height for a particular operation of reservoir 36, and thereby of leg 32 and the surfaces of the system liquid in legs 31 and 32, and to afford an appropriate balance so that reservoir 36 will remain in whatever position to which it may be moved by rotation of shaft 42 and sheave 41. If desired, latch means of a conventional nature may be provided to hold reservoir 36 on guide rods 38 at whatever height the reservoir is to be set.

A worm wheel 44 is also keyed to shaft 42 and engages a worm gear 45 on a cross shaft 46. A knob 47 is fastened to the end of shaft 46 so that by means of the rotation thereof, reservoir 36 can be adjusted in height relative to reservoir 34. In effect, the turning of knob 47 adjusts the relative heights of the two legs 31 and 32 so that over the entire pressure range to be encountered within the design capacity of the particular embodiment, the manometer liquid 48 will remain in the U-tube 30 and will actuate float 35 between its operable zone levels for that selected portion of that range which is unsuppressed after moving through whatever height in leg 31 corresponds to a suppressed portion of the range in advance of reservoir 34.

In the embodiment shown in Figure 2, reservoir 34 is so constructed that float 35 will rest on the bottom thereof when the surface level of liquid 48 on that side passes into leg 31 below the bottom of chamber 34. The plane of the surface of the manometer liquid in leg 31 at the instant float 35 begins to float may be termed the initial actuation level. The final actuation level may be applied to that plane coinciding with the surface of the manometer liquid in chamber 34 above which no further upward movement of float 35 can take place because, for example, of the impingement of stem 49 against the top of chamber 34. The space between the two float actuation levels may be considered as the actuation zone.

A link 50 pivotally connects stem 49 to a deflection shaft 51 to which link 50 is keyed. Substantially frictionless bearings 52 are provided in the walls of chamber 34 to journal shaft 51. Bearings 52 are also usually made pressure-tight to keep casing 34 pressure-tight. A combined indicator pointer and recording pen 53 is fastened to shaft 51 and extends normally thereto so as to move across the face of a recording chart 54 and a calibrated scale 55 in the course of the deflections thereof produced by vertical movement of float 35 as a result of changes in the level of the surface of manometer liquid 48 in leg 31 within the actuation zone. The recording chart 54 is mounted on a shaft 54a and is usually calibrated, and rotated as by an electrical clockwork 54b to give a permanent record of the pressure changes in the unsuppressed portion of the range. Instead of operating an indicator-recorder as shown in Figure 2, the rotation of shaft 51 may equally well be caused to actuate a process controller of any conventional form.

A datum pressure, corresponding in a given operation to the difference in pressures which must exist before the system liquid in leg 31 rises to coincide with the initial actuation level, may be read on that marking on a fixed calibrated dial 56 pointed to by a pointer 57 keyed to a shaft 58. Shaft 58 is provided with a spur gear 59 keyed thereto. Gear 59 is in meshing engagement with an idler gear 60 fixed on a shaft 61. Idler gear 60 in turn meshes with a spur gear 62 keyed to shaft 46. Thus as knob 47 is turned, pointer 57 will move in the same direction around dial 56 to show the height at which reservoir 36 is set relative to the height of reservoir 34 and thus the datum pressure differential which must exist between low-pressure tap 63 and high-pressure 64. These taps are respectively connected to and lead into the reservoirs 34 and 36 above the manometer liquid surfaces. In other words, dial 56 and pointer 57 cooperate to show the extent of the suppressed portion of the overall pressure range which is, in the embodiment shown in Figure 2, in advance of the actuation zone between the initial and final actuation levels in chamber 34. Thus, whenever the pressure differential moves the surface of the system liquid in leg 31 into the actuation zone, the aggregate pressure differential will be the sum of the reading on dial 56 plus either the reading on chart 54 or that on scale 55.

Turning to Figure 3 and applying the corresponding parts thereof to the numerals applied to the embodiment shown in Figure 2, it may readily be shown how the suppression of any desired portion of an extensive operating pressure range can be obtained by the practice of the system of this invention without sacrificing flexibility, accuracy or sensitivity. Let it be assumed that the overall pressure range to be encountered aggregates 100 inches of water and that suppression is desired for that portion of the range between 0 inches and 90 inches of water. In such a case, reservoir 36 will be lowered until the liquid level in legs 31 and 32 on the basis of assumed equal pressure in taps 63 and 64 would be at the level indicated by the numeral 65. Level 65 corresponds to that common starting level which under an impressed pressure differential of 90 inches of water would move the liquid surface in leg 31 to the initial actuation level. Such equal pressure may be actually obtained by closing off the connections to the respective pressure sources by valves and opening both taps 63 and 64 to atmosphere during the predetermined adjustment of reservoir 36.

As reservoir 36 is lowered to the same position necessary to provide the common level 65 if both taps 63 and 64 had been opened to atmosphere, the pointer 57 will rotate relative to dial 56 until it stops opposite a suitable marking such as "90." By the same token, the indicator scale 55 may be calibrated in ten divisions marked from 90 to 100 and arm 53 will point to 90 on scale 55 inasmuch as float 35 will be resting at the bottom of chamber 34. By virtue of dial 56 and pointer 57 or other positional marking, the taps 63 and 64 need not be disconnected from their respective low-pressure and high-pressure sources enabling the unsuppressed portion to readily be shifted. In the given example, however, not until the pressure differential between the pressures respectively in tap 63 and tap 64 equals 90 inches of water will the surface of the manometer liquid in leg 31 rise until it reaches the dotted line marked 66 which indicates the initial actuation position of float 35. When the surface of the manometer liquid in side 31 coincides with plane 66, the surface of the manometer liquid in leg 32 will be at level 66a, 90 inches below level 66 if water is used as a system liquid and a correspondingly lesser distance if mercury is used as the manometer liquid in accordance with the well-known specific gravity relationships of those two liquids.

If, therefore, the pressure in tap 64 should rise further above a pressure differential of 90 inches, relative to the pressure in tap 63, by an amount equal to 10 inches of water, the level of the surface of the liquid in leg 32 would drop further to a position indicated by the dot-and-dash line 68. At the same time, the surface of the liquid in leg 31 would rise to the dot-and-dash line marked 69 indicating the final actuation level when pointer 53 would be in the position indicated by the dot-and-dash line 70. The actuation zone for the measurement device shown in Figure 3 lies between the levels indicated respectively by the numerals 66 and 69. Thus, there is no indication on scale 55 during the period that the relative difference in pressure between the pressure above the surface of the liquid in leg 31 and the pressure above the surface of the liquid in leg 32 remains in that portion of the overall pressure range below 90 inches of water. However, the instant that the pressure differential moves into the unsuppressed portion between 90 inches and 100 inches of water where the operation may have to be very carefully watched, an accurate and sensitive indication is provided by the scale 55 or by a recording chart or by the actuation of some suitable controller of conventional make.

Similarly, a greater portion of the pressure range can be suppressed by still further lowering reservoir 36 an appropriate distance. Conversely, if a lesser portion of the operating range is to be suppressed, reservoir 36 can be raised an appropriate distance necessary thereto. Although the example discussed in connection with Figure 3 recites an operating pressure range overall of about 100 inches of water, that is a matter which will vary with the particular capacity of the apparatus built in accordance with this invention.

It is desirable to magnify the actuation of the measurement device of this invention over the selected unsuppressed portion of the operating range. One method of doing this may be to produce a change in the level of the liquid surface in leg 31 substantially at least equal to the inverse change in the level of the liquid surface in leg 32. Thus, in the embodiment shown, the internal cross sectional area of reservoir 36 is made equal to the internal cross sectional area of reservoir 34, placing them on a one-to-one basis insofar as any change in the level of the respective liquid surfaces is concerned within the respective reservoirs. In this way, the sensitivity of an instrument made in accordance with this invention such, for example, as shown in Figures 2 and 3, may be so great as to be able to show a pressure change of one-hundredth of an inch of water in an overall range of 100 inches of water, an advantage of great value in many fields. Larger or smaller cross sectional areas of reservoir 36 relative to the cross sectional area of reservoir 34 will produce correspondingly greater or lesser magnification.

On the other hand, the narrow portion of leg 31 below reservoir 34 is useful in producing relatively great vertical movements of manometer liquid in leg 31 relative to the movements of the liquid surface in leg 32 over the preselected suppressed portion of the operating range in advance of the actuation zone. The narrower portions of the U-tube 30 are sufficiently large, however, in internal cross sectional area to avoid any capillary effect capable of adversely affecting the accuracy of the new system. Further, so long as vertical movement of the system liquid within the actuation zone is proportional to the inverse vertical movement of the system liquid in the other leg thereof, the markings on any scale or chart showing the extent of movement within the unsuppressed portion of the pressure range will be spaced uniformly. However, as will be evident to those skilled in the art, when the vertical movement of the liquid surface in the actuation leg such as leg 31, involves an inverse vertical movement in the other leg which is not proportional because of varying cross section, for example, in said other leg, the scale or chart markings will not be uniform throughout but will have to take the changeover in volumetric proportion into account. Thus, in this latter situation, if in the embodiment of Figure 3, the level 68 in leg 32 should have occurred below reservoir 36 in flexible tube 33, the markings on scale 55 would have to be correspondingly closer between the pressure marking representing the differential where the liquid surface in leg 32 enters tube 33 and the "100" marking. Normally, the apparatus will be constructed so that all foreseeable liquid levels in leg 32 will remain within reservoir 36.

In the modification of this system shown in Figure 4, the parts therein corresponding generally in construction and purpose to the parts shown in the embodiment of Figure 2, are marked with the same numerals, primed. However, in the modification of Figure 4, the dial and pointer structure has been omitted and in place thereof an arm 80 is keyed to shaft 61' to operate a link 81 pivotally connected to the end of arm 80. Link 81 in turn rocks a second arm 82 the hub of which is journaled on shaft 51' but is not fastened to said shaft. A pen arm 83 is integral with the hub of arm 82 so that as knob 47' is turned pen 83 will move to a new datum pressure position on chart 54', the calibrations of which are suitable both to the markings of pen 83 and of pen-indicator 53'. Thus, if the operator of a modification such as that shown in Figure 4, should wish to decrease the suppression in the system from the datum pressure difference represented by the radius of the line "A" on the chart to a lesser suppression corresponding to the radius on chart 54' indicated by arc "B" between operation cycles of the equipment to which the system is applied, the operator would rotate knob 47' counter-clockwise bringing pen 83 to position along arc "B." Thereafter, any movement of float 35' within the actuation zone would also move pen 53', thus providing on a single chart both the advance suppression before the actuation zone and the vernier indication made by pen 53' in additive relation to the value of the marking made by pen 83. Chart 54' in this case will usually be made with two scale ranges for the respective pens depending upon the specific construction employed and normally will use a different colored ink in each pen.

In the modification shown in part in Figure 5, a system is provided generally similar to the basic system shown in Figure 2 and where the parts of the Figure 5 modification correspond generally in construction and purpose to parts shown in the embodiment of Figure 2, they are given the same numbers, double primed. In addition, the modification of Figure 5 is specifically constructed to enable an operator to provide an intermediate portion as the unsuppressed portion of the pressure range to be encountered. Normally, the ending extreme of a pressure range is the critical portion which calls for unsuppressed indication recording, or control and magnification as shown by the embodiment set forth in Figure 2. In other cases, due to the peculiarity of the process or equipment used, an intermediate portion of the pressure range will be the one of greater interest. In this latter case, the embodiment shown in Figure 5 can be applied.

Thus, assuming that the modification of Figure 5 has been designed for an overall pressure range of 100 inches of water and that the critical range is regarded as the pressure difference between 60 inches and 70 inches of water, the movable reservoir 36" will be moved below reservoir 34" a distance corresponding to a datum pressure of 60 inches of water. At 60 inches of water the surface of the system liquid in leg 31" will reach the initial actuation level 66". The final actuation level 69" will be reached by the system liquid surface at 70 inches of water because of the proper proportioning of the respective parts of the system in the construction thereof. At level 69", float 35" will have moved pointer 53" to the dot-and-dash position shown in alignment with position 70 on scale 55'. No further elevation of float 35" is possible despite a still further increase in the pressure difference above 70 inches of water, for the example given, because of the abutment of the top of stem 49″ against the bottom of an adjustable stop 90. Nevertheless, the system can absorb further increases in the height of the surface in the system liquid in leg 31″ inasmuch as reservoir 34″ is sufficiently increased in capacity and height for that purpose. Thus, at the exampled 100 inches of water in pressure differential across the taps of the system, the surface of the manometer liquid might reach the dot-and-double-dash line 91. In this way, the system remains operative throughout even though the unsuppressed portion of the entire range is intermediate the extremes thereof. It may be noted that in the embodiment of Figure 5 the link 50″ is slotted at its lower end so that the shaft 51″ and its bearings 52″ (not shown) can be placed above the topmost system liquid level 91 likely to be encountered in leg 31″. Such a construction is particularly suited to systems of this invention in which mercury may be used as the manometer liquid.

Adjustable stop 90 has an enlarged upper threaded end 92 which threadably engages a tapped axial bore 93 in a sleeve 94 through which stop 90 passes. Sleeve 94 is affixed to the top of chamber 34″. Stop 90 is locked in place by means of a lock nut 95 after the desired adjustment has been made. Such adjustment is made by turning a knurled knob 96 fixed to the top of stop 90 until it reaches its predetermined position as indicated by an annular pointer 98 fixed to the top of rod 90. The periphery of pointer 98 cooperates with the markings on a scale 99 fixed to the top of chamber 34″ to show the pressure difference that will be reflected by the movement of float 35″ through the entire height of its actuation zone. For the setting shown in Figure 5, in the exampled illustration of 100 inches of water, stop 90 will limit the movement of float 35″ after a change in the height thereof corresponding to 10 inches of water pressure.

Should it be desired to have a greater or lesser differential pressure included within the unsuppressed portion of the pressure range, stop 90 can be correspondingly raised or lowered. Such raising or lowering will define a new final actuation level and correspondingly change the height of the actuation zone. At the same time, the extreme right-hand position of pen 53″ on scale 55″ will also correspondingly shift. If the unsuppressed portion of the range is to be shifted, then a new card with the appropriate markings covering the newly selected unsuppressed portion of the pressure range can be substituted on the scale 55″ for the card shown in Figure 5. Or, scale 55″ may be suitably divided into subdivisions and marked, for example, from 0 to 10 or 0 to 15 and used for all ranges for the particular instrument in which case the total differential reading will equal the sum of the datum pressure difference in advance of the actuation zone necessary to move the system liquid level to 66″ plus the unsuppressed portion reading on scale 55″.

Various other modifications and various reversals of operation of the system of this invention may be made by those skilled in the art without departing from the spirit of this invention as defined by the scope of the appended claims.

I claim:

1. A manometer of the U-tube class comprising, in combination, a reservoir in each leg of said manometer, each of said reservoirs being subject to a respective pressure, a flexible connection for manometer liquid extending between said reservoirs, manometer liquid in said manometer, a member in one of said reservoirs, said one of said reservoirs having means providing a lowermost limit of movement for said member, said member being movable in accord with movement of the surface of said manometer liquid above the lowermost limit of movement of said member in said one of said reservoirs, an actuation part connected to said member and movable in correspondence with movements of said member, and means for adjusting said reservoirs a vertical distance apart relative to each other such that said surface of said manometer liquid may be moved below said lowermost limit of movement of said member, whereby movement of said surface within a selected difference in pressure values between said pressure sources will occur below said lowermost limit of movement of said member thereby being "suppressed" whereas said surface will move said member in accord with differences in pressure which are greater than said selected difference in pressure values.

2. A manometer of the U-tube class, comprising, in combination, a pair of reservoirs, each of said reservoirs being connected to a respective pressure source, a flexible U-tube connected to said reservoirs adjacent the respective lower ends thereof, a predetermined quantity of manometer liquid in said manometer, a member in one of said reservoirs having lower and upper limits of movement therein corresponding to movements of the surface of said manometer liquid in said one of said reservoirs within said limits, said member being connected to an actuation part extending outside said one of said reservoirs for movement in accordance with movements of said member within said one of said reservoirs, and means to adjust the vertical distance between said reservoirs relative to one another to move said surface of said manometer liquid below said lower limit, whereby movement of said surface within said manometer but below said lower limit due to pressure differences will not effect said member while movement of said surface because of a greater difference in pressure between said pressure sources within said lower and upper limits will move said member to move said actuation part correspondingly to provide unsuppressed actuation within said limits.

3. A manometer of the U-tube class having two legs, comprising, in combination, a reservoir in each leg, each of said legs being subject to a respective pressure source, a flexible U-tube connecting said legs and being attached to said reservoirs adjacent the respective lower ends thereof, the internal cross-sectional area of said flexible U-tube being generally less than the respective internal cross-sectional areas of said reservoirs, said reservoirs being generally uniform in their respective horizontal cross-sectional areas, a predetermined quantity of manometer liquid in said manometer, a movable member like a float in one of said reservoirs, said movable member having upper and lower limits of movement in said one of said reservoirs corresponding to movement of the horizontal surface of said manometer liquid within said limits in the leg of said manometer containing said one of said reservoirs, a shaft extending to the outside of said one of said reservoirs for movement in accordance with the movements of said member within said one of said reservoirs, means connected to said shaft outside said one of said reservoirs responsive to the movement of said movable member, and means to adjust the other of said said reservoirs a vertical distance below said one of said reservoirs such that said surface of said manometer liquid will move below said lower limit a distance corresponding to a selected datum difference in pressure between said pressure sources but a greater difference in pressure than said datum difference will move said surface above said lower limit, whereby movement of said surface only within said limits in said leg containing said one of said reservoirs will move said shaft to operate said means connected to said shaft.

4. A manometer for measuring the difference between two pressures, and comprising, in combination, a pair of reservoirs each having a top and bottom, one reservoir being subject to one of said pressures, and the other of said reservoirs being subject to the other of said pressures, a flexible manometer liquid connection extending between said reservoirs adjacent their bottoms, said flexible connection being of sufficient length and the reservoirs being arranged so as to permit at least one of said reservoirs to be adjustably positioned at a selected vertical distance relative to the other of said reservoirs, manometer liquid in said manometer in a predetermined quantity which with the liquid capacities of said reservoirs and said connection, and the said distances are so related that the relative positioning of one of said reservoirs a vertical distance above the other will move the manometer liquid in the leg of said one of said reservoirs below it when said pressures are substantially equal and will require a given difference in said pressures to move said level into said one of said reservoirs, a calibrated scale of pressure values, one of the extreme values on the scale being said given difference in said pressures and the remainder of the scale extending through a further difference in pressure values, a movable member arranged to move in the manner of a float in said one of said reservoirs when said liquid is in said one of said reservoirs, and index means connected to said movable member to move along said scale when said movable member is moved by said liquid in said one of said reservoirs.

References Cited in the file of this patent

UNITED STATES PATENTS

| | | |
|---|---|---|
| 1,000,892 | Bristol | Aug. 15, 1911 |
| 1,229,805 | Stevenson | June 12, 1917 |
| 1,337,969 | Shorey | Apr. 20, 1920 |
| 1,540,322 | Folsom | June 2, 1925 |
| 2,266,955 | Borden | Dec. 23, 1941 |
| 2,380,177 | Hicks | July 10, 1945 |
| 2,389,508 | Hejduk | Nov. 20, 1945 |

FOREIGN PATENTS

| | | |
|---|---|---|
| 16,246 of 1890 | Great Britain | Aug. 8, 1891 |
| 249,743 | Germany | June 13, 1911 |
| 257,980 | Germany | May 29, 1912 |
| 101,268 | Austria | Oct. 10, 1925 |
| 125,139 | Austria | Oct. 26, 1931 |